United States Patent

Blount

[11] Patent Number: 6,054,515
[45] Date of Patent: Apr. 25, 2000

[54] FLAME RETARDANT COMPOUNDS AND COMPOSITIONS

[76] Inventor: David H. Blount, 6728 Del Cerro Blvd., San Diego, Calif. 92120

[21] Appl. No.: 09/033,079

[22] Filed: Mar. 2, 1998

[51] Int. Cl.[7] .................................................. C08K 5/5357
[52] U.S. Cl. .......................... 524/118; 252/609; 524/405
[58] Field of Search ............................. 252/609; 524/405, 524/417, 118

[56] References Cited

U.S. PATENT DOCUMENTS

| | | | |
|---|---|---|---|
| 4,380,610 | 4/1983 | Fenton et al. | 525/400 |
| 4,855,127 | 8/1989 | Abrutyn et al. | 424/411 |
| 5,051,486 | 9/1991 | Kuroda et al. | 526/279 |
| 5,091,480 | 2/1992 | Percec | 525/391 |
| 5,328,745 | 7/1994 | Kurihara et al. | 428/141 |
| 5,344,931 | 9/1994 | Cipolli et al. | 525/100 |
| 5,430,081 | 7/1995 | Ohmae et al. | 524/100 |
| 5,788,915 | 8/1998 | Blount | 528/259 |
| 5,859,147 | 1/1999 | Torre et al. | 524/119 |

*Primary Examiner*—Veronica P. Hoke

[57] ABSTRACT

A flame retardant salt of organic polyphosphorus compound and/or composition are produced by reacting an organic phosphorus compounds with an inorganic phosphorus compound to produce an organic polyphosphorus compound, which is then reacted with a salt forming compound, such as a nitrogen-containing compound, which is then incorporated in or on a more flammable organic material. The more flammable organic material such as thermoplastic resins are made less flammable by melt-kneading a more flammable resin with a salt of organic polyphosphorus compound, a carbonization compound, a metal-containing compound having a carbonization acceleration effect, a comb-like polymer consisting of a polyethylene main chain and a polyoxyalkylene side chain and a filler.

17 Claims, No Drawings

FLAME RETARDANT COMPOUNDS AND COMPOSITIONS

This application concerns novel compositions containing salts of organic polyphosphorus compounds. These flame retardant compounds contains two or more atoms of phosphorus in each molecule. The flame retardant compounds of this invention may be utilized as flame retardants by incorporating these compounds within or coating a more flammable organic material. In particular, it relates to a flame retardant compounds and a flame retardant thermoplastic resin compositions which are free from such a toxicity problem due to a halogen gas generated during combustion or molding as in the use of a halogen-containing flame retardant compound.

BACKGROUND OF THE INVENTION

The use of ammonium polyphosphate salts as a flame retardant compound is well know in the arts. The salts of organic polyphosphorus compounds of this invention are novel compounds which have desirable properties which decrease flammability and smoke production when these products are burned or when products containing these compounds or compositions are burned. Many organic phosphorus containing compounds and their salts have been produced, and there are many patents related to production and use of organic phosphorus containing compounds. Many other flame retardants have also been known, for example and examples thereof are mentioned in, for example, Fine Chemical, Vol. 20, No. 11 (1991), pp. 9–36. The salts of organic polyphosphorus compounds of this invention as flame retardants are an improvement over the known salts of organic phosphorus compounds as flame retardant compounds because they do not contain halogens. Many of the salts of organic polyphosphorus compounds contain halogens, such as found in U.S. Pat. No. 4,755,547, produces toxic fumes when burned. The salts of organic polyphosphorus compounds of this invention are also an improvement over known salts of organic phosphorus compounds, in regards to their ability to with stand high enough temperature without decomposing, so they can be mixed in thermoplastic resin and produce a flame retarded resin. Another improvement of these flame retardant compounds of this invention over the prior art flame retardants are their ability to be used in small amounts, so that the physical properties of the thermoplastic resins are not deteriated and the molding processing characteristics and surface appearance of molded article obtained therefrom are not deteriorated.

The object of this invention is to provide salts of organic polyphosphorus compounds and compositions containing salt of organic polyphosphorus compounds which are capable of rendering organic material less flammable. These flame retardant compounds may be utilized in the production of insulation foams, building components, coating agents, surfactants, molded plastic products an many other uses.

SUMMARY OF THE INVENTION

This invention purpose is to provide flame retardant compounds and flame retardant organic material, such as, flame retarded thermoplastic resin compositions which are free from halogen and have excellent flame retardant, good resin properties and excellent molding processing characteristics.

In one respect, the invention comprises reacting organic phosphorus compounds, inorganic phosphorus compounds and basic salt forming compounds to produce salts of organic polyphosphorus compounds. Another aspect, the invention comprises utilizing the salt of organic polyphosphorus compounds of this invention by incorporating in, or apply on a more flammable organic material to render the organic material less flammable. Another aspect of the invention is a process to prepare the salt of organic polyphosphorus comprising serially contacting A) an organic phosphorus compound;
B) an inorganic phosphorus compound which will react with an organic phosphorus compound;
C) a salt forming compound that will react with an organic polyphosphorus compound;
D) carbonization auxiliaries;
E) carbonization accelerating compounds;
F) filler;

under conditions sufficient to prepare the salt of organic polyphosphorus compound. The sequence of the addition of components A, B and C may be varied depending on the end product desired. Components A and B are usually reacted first then component C is added and reacted. When component A is an organic polyphosphorus compound which will react with component C then component B may or may not be utilized. Components B and C may be first be reacted then reacted with component A. Component A, B and C may be added to the more flammable organic material then reacted. Component (A) is utilized in the amount of 100 to 200 parts by weight, Component (B) is utilized in the amount of 0 to 100 parts by weight and Component (C) is utilized in the amount of 30 to 200 parts by weight. Component (D) is utilized in the amount of 0 to 100 parts by weight. Component (E) is utilized in the amount up to 0 to 30 parts by weight. Component (F) is utilized in the amount of 0 to 400 parts by weight. The salt of organic polyphosphorus compound and/or the flame retardant composition of this invention is added to or applied on the more flammable organic material in an amount of 5 to 50 parts by weight based on 100 parts by weight of the more flammable organic material.

In another aspect, according to this invention, there is provided a flame retardant thermoplastic resin composition which comprises (1) a thermoplastic resin, (2) a nitrogen containing salt of organic polyphosphorus compound produced by the process of this invention, (3) a comb-like polymer consisting of a polyethylene main chain and a polyoxyalkylene side chain and (4) a metal-containing compound having a carbonization accelerating effect, (5) filler, in the amount of component (1) being 100 to 200 parts by weight, of component (2) being 5 to 100 parts by weight, of component (3) being 0 to 30 parts by weight and of component (4) being 0 to 30 parts by weight and of component (5) being 0 to 400 parts by weight. Component (2) is preferably used in the amount of 5% to 30% based on the weight of the more flammable organic material.

Component A

Any suitable organic phosphorus compound may be used in this invention, such as, but limited to, organic phosphites, phosphonates, phosphate, hydrogen phosphites, hydrogen phosphates, polyphosphates, polyphosphonates, polyphosphites, phosphites-phosphates, phosphorus esters, polyphosphorus esters, pyrophosphoric acids, acid phosphates, polyphosphonate esters, diphosphoric acid esters, and phosphines, alkyl chlorophosphines and mixtures thereof. The organic polyphosphonates such as cylic phosphonate esters (ANTIBLAZE N [65% phosphonic acid, methyl-,(5-ethyl-2-methyl-1,3,2-dioxaphosphorinan-5-yl), methyl methyl ester, P-oxide and 19% phosphonic acid, methyl-bis(5-ethyl-2methyl-1,3,2-dioxaphosphorinan-5yl) ester, P,P'-dioxide] and ANTIBLAZE 1045 [85% phosphonic acid, methyl-bis(5-ethyl-2-methyl-1,3,2-dioxaphosphorinan-5-yl}ester, P,P'-dioxide and 8% phosphonic acid, methyl-,(5-ethyl-2-methyl-1,3,2-dioxaphosphorinan-5-yl)methyl methyl ester, P-oxide] by Albright and Wilson) are the preferred organic phosphorus compounds.

Suitable organic phosphites include alkyl phosphites, dialkyl phosphites, trialkyl phosphites, dialkyl hydrogen phosphite, diaryl phosphites, aryl-alkyl phosphites, triaryl phosphites, dialkyl-aryl phosphites, etc. Suitable organic phosphonates include dialkyl alkyl phosphonates, aryl-alkyl phosphonates, diaryl alkyl phosphonates, etc. Suitable organic phosphates include alkyl dihydrogen phosphates, dialkyl hydrogen phosphates, trialkyl phosphates, aryl dihydrogen phosphates, diaryl hydrogen phosphates, triaryl phosphates, aryl-dialkyl phosphate, diaryl alkyl phosphate, etc.

Component B

Any suitable inorganic phosphorus compound may be used in this invention. Suitable inorganic phosphorus compounds include, but not limited to, phosphoric acid, polyphosphoric acid, pryophosphoric acid, phosphorus oxide, phosphorus trihalides, phosphorus oxytrihalide, salts of hydrogen phosphoric acid, phosphonic acid, ammonium phosphate, ammonium polyphosphate, triphosphorus acid, metaphosphoric acid, phosphorous acid, hypophosphorous acid, phosphinic acid, phosphinous acid, phosphinic oxide, phosphorus esters, phosphorus trioxide, phosphorus pentioxide, phosphorus thiochloride and mixtures thereof. Phosphoric acid is the preferred inorganic phosphorus acid.

Component C

An suitable salt forming compound that will react with an organic phosphorus compound or inorganic phosphorus compound may be used in this invention. Suitable salt forming compounds include, but not limited to, compounds containing alkali metals, alkaline earth metals, metals, and nitrogen containing compounds such as compounds containing ammonium radicals, ammonia, amines, amino compounds, polyamines, aminoplasts, salts of amines, polyamines, amino compounds, and aminoplasts, other nitrogen containing compounds and mixtures thereof. Amino compounds are the preferred salt forming compounds, particularly melamine.

Component D

Any suitable carbonization auxiliaries may be utilized in this invention. Suitable carbonization auxiliaries are compounds that in the presence of fire assist the formation of a carbonization foam or char, such as, additives that produce acidic components in the pyrolysis mixture, such as phosphorus acids, boric acids or sulfuric acids. These acidic components are compounds such, for example, acids or salts, or their derivatives of sulfur, boron and phosphorus, such as, boron-phosphates, phosphates, and polyphosphates of ammonia, amines, polyamines, amino compounds, thioureas and alkyanolamines, but boric acid and its salts and their derivatives, organic phosphorus compounds and their salts, halogenated organic phosphorus compounds, their salts and their derivatives may also be used for this purpose.

Phosphorus containing compounds, such as, boron-phosphates, phosphates, and polyphosphates of ammonia, amines, polyamines, amino compounds, thioureas and alkyanolamines, boric acid and its salts and their derivatives, organic phosphorus compounds and their salts, halogenated organic phosphorus compounds, their salts and their derivatives may also be used for this purpose. The carbonization auxiliaries and other flame retardant agents may be used in quantities of 0 to 100 parts by weight.

The nitrogen containing salts of phosphorus acids are the preferred carbonization compounds, such as amino phosphate, amino salts of organic phosphorus compounds and amino condensation salt of inorganic and organic phosphorus compounds. The amino condensation salt of phosphorus compounds are produced by contacting the amino condensation compounds with a phosphorus containing compound that will react with an amino compound, under conditions sufficient to prepare an amino condensation salt of a phosphorus containing compound. Suitable inorganic phosphorus compounds include, but not limited to, phosphoric acid, pyrophosphoric acid, triphosphoric acid, metaphosphoric acid, phosphorous acid, hydrophosphorous acid, phosphinic acid, phosphinous acid, phosphine oxide, phosphorus trihalides, phosphorus oxyhalides, phosphorus oxide, mono-metal hydrogen phosphates, ammonia dihydrogen phosphate, bromated phosphates, alkali metal dihydrogen phosphate and halogenated phosphate-phosphite and their halides and acids. Organic phosphorus compounds include, but not limited to, alkyl, cyclic, aryl and alkyl-aryl phosphorus compounds, such as, alkylchlorophosphines, alkyl phosphines, alkyl phosphites, dialkyl hydrogen phosphites, dialkyl alkyl phosphonates, trialkyl phosphites, organic acid phosphates, organic phosphonate esters, aryl phosphites, aryl hydrogen phosphates, halogenated phosphonates esters and mixtures thereof. Amino condensation borates may be produced by contacting boric acid and amino condensation compound under conditions sufficient to prepare the amino condensation borates which may also be utilized and also ammonia borates may be used. Amino condensation boron-phosphates may be produced by contacting boron-phosphates and amino condensation compounds under conditions sufficient to prepare amino condensation boron-phosphate compounds which may also be utilized. The salt forming phosphorus containing compounds will react with the amino condensation compounds to form an amino condensation salt of a phosphorus containing compound which may also be used.

Component F

Any suitable filler may be used in this invention. The fillers that may be utilized in the flame retardant mixture are usually insoluble in the reaction mixtures. They may be inorganic substances, such as, alkali metal silicates, alkaline earth metal silicates, metal silicates, silica, and metal, oxides, carbonates, sulphates, phosphates, and borates, glass beads or hollow glass beads. Hydrated aluminum oxide is the preferred inorganic compound. They may be organic substances, such as, amino compounds, such as urea, melamine, dicyandiamide, and other cyanuric derivatives or their formaldehyde resins, amino phosphates, amino salts of organic phosphates, phenol-aldehyde resin powder, powdered coke, graphite, graphite compounds and mixtures thereof. The organic halide flame retardant compounds may also be added as fillers.

Any suitable organic material which is more flammable than the salt of organic polyphosphorus compounds of this invention may be used in this invention. Any suitable plastic resin composition or mixtures thereof and any suitable natural organic material may be used in this invention and mixtures thereof. These materials may be in the form of a solid, cellular, suspension, emulsion or solution. Suitable plastic resin include, but not limited to, vinyl dienes, vinyl diene copolymers, polyesters, polyester resins, phenoplasts, aminoplasts, polyepoxy resins, polyurethanes, furans, polyamides, polyimides, polycarbonates, silicones, polyethers, thioplasts, polytetrafluoroethylene, polysulfones, urethane-epoxy resins, urethane silicate resins or foams, cellulose nitrates, regenerated cellulose, cellulose esters, cellulose ethers, cyanoethyl cellulose and mixtures thereof.

Suitable natural products include, but not limited to, wood, cellulose, lignin-cellulose, paper, cotton, wool, linen, dammars, copols, other natural resins, natural rubber, natural proteins, e.g., soya bean protein, silk, glues, gelatin, etc., modified cellulose and mixtures thereof.

Any suitable isocyanate may be used in this invention. Organic polyisocyanates are preferred. The commercial available ones are preferred such as tolylene-2,4-diisocyanate, tolyene-2,6-diisocyanate, polymethylene polyphenyl isocyanate, diphenyl methane 4,4'-diisocyanate, 3-methlydiphenyl-methane-4,4'-diisocyanate, m- and p-phenylenediisocyanante, polyphenylpolymethylene isocyanates obtained by phosgenation, commercially known as "crude MDI", modified polyisocyanates and mixtures thereof. Suitable organic polyisocyanate are exemplified by the organic diisocyanates which are compounds of the general formula:

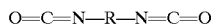

wherein R is a divalent organic radical such as an alkylene, aralkylene or arylene radical. Such radical may contain 2 to 20 carbon atoms. Any suitable compound with active hydrogens may be reacted with the polyisocyanates to produce polyurethane products. The preferred compound with active hydrogens are polyols. Polyurethane catalyst, blowing agents, surfactants, foam stabilizers and fillers may also be used. Any suitable polyepoxy compounds may be used in this invention such as allyl glycidyl etlher, tert-butyl glycidyl ether and other polyepoxides.

Component (1)

Any suitable thermoplastic resin may be used in this invention. Suitable thermoplastic resins include the olefin polymers. The olefin polymers include, for example, homopolymers and copolymers of olefins such as ethylene, propylene, butene-1, pentene-1, hexene-1, heptene-1, octene-1, octene-1 and the like, and specific samples thereof include polyethylene, polypropylene, ethylene-polypropylene copolymers, ethylene-butene-1 copolymer, ethylene-hexene-1 copolymers, and ethylene-octene-1 copolymers.

Said olefin polymers also include copolymers of said olefin with polar monomers comprising the olefin unit as the main constituent, specifically ethylene-vinyl acetate copolymer, ethylene-methymethacrylate copolymer, ethylene-acrylic acid copolymer, ethylene-vinyl alcohol copolymer and the like. These olefin polymers may be used alone or in combination of two or more. The thermoplastic resin in this invention includes homopolymers and copolymers of unsaturated carboxylic acids and their alkyl esters such as acrylic acid, methacrylic acid, methylacrylate, methylmethacrylate, and the like and vinyl esters of saturated carboxylic acids such as vinyl acetate, vinyl butrate and the like. These homopolymers and copolymers may be used alone or in combination of two or more.

Said vinyl aromatic polymers include, for example, homopolymer and copolymers of styrene monomers such as styrene, a-methylstyrene and vinyl styrene, and specific examples thereof include polystyrene, poly-a-methylstyrene, polyvinyltoluene, styrene-a-methylstyrene copolymers and the like. The vinyl aromatic polymers further include, for example, copolymers of styrene with acrylonitrile monomer, maleimide monomer, acrylic acid ester monomer, maleic acid monomer, and specific examples thereof include styrene-acrylonitrile copolymer, styrene-butadiene-acrylonitrile copolymer, styrene-methylacrylate copolymer, styrene-maleic anhydride copolymer and the like.

Said vinyl aromatic polymers may also be modified with a rubbery polymer, and the rubbery polymer includes, for example, polybutadiene, styrene-butadiene copolymer, butadiene-acrylonitrile copolymer, ethylene-propylene-diene copolymer, butadiene-acrylic acid ester copolymer and the like. These vinyl aromatic polymers may be used alone or in combination of two or more.

Furthermore, the thermoplastic resin in this invention includes also engineering plastics such as polyphenylene ether, rubber-modified polyphenylene ether, polyethylene terephthalate, polybutylene terephthalate, polyamide, polycarbonate, polyacetal, polysulfone, polyethersulfone, polyphenyene sulfide, polyarylate, polyamide-imide, polyetheramide, polyetherketone, polyetheretherketone, polyimide and the like. The thermoplastic resins in this invention may also be chemically modified products, blends and alloyed products of the above-mentioned thermoplastic resins or may be reinforced with glass fiber or the like.

As the thermoplastic resin to be used in this invention, among the above-mentioned examples, particularly preferable in industry are those consisting of one or more olefin polymers mentioned above or those consisting of one or more vinyl aromatic polymers in view of the moldability and mechanical properties of a flame retardant resin composition prepared by mixing the thermoplastic resin with component (2) a salt of an organic polyphosphorus compound, component (3) a comb-like polymer consisting of a polyethylene main chain and a polyoxyalkylene side chain, (4) a metal-containing compound having a carbonization accelerating effect, (5) a carbonization auxiliary and (6) a filler.

When halogen-containing resins, for example, polyvinyl chloride, polyvinylidene chloride, chlorinated polyethylene, chlorosulfonated polyethylene and the like, are used as polymer of this invention, the flame retardant can be improved, but the halogen-containing resins become a source of generating a toxic gas due to the halogen element contained therein when the resins are burned, and hence, are not the optimum resins to be used in this invention.

Component (2)

Component (2), salt of organic polyphosphorus compounds are produced by the process of this invention as stated above, by reacting component A, an organic phosphorus compound, component B, an inorganic phosphorus compound and component C, a salt forming compound. The preferred salt of an organic polyphosphorus compounds to be use to flame retard thermoplastic resins are nitrogen containing salts of organic polyphosphorus compounds. The preferred nitrogen containing compound is melamine or a combination of melamine and another amino compound and/or ammonia which is reacted with the organic polyphosphorus compound. The preferred organic polyphosphorus compounds are cyclic phosphorus esters, for example, phosphonic acid, methyl-,(5-ethyl-2methyl-1,2,3-dioxaphosphorinan-5-yl)methyl,methyl ester, P-oxide and phosphonic acid, methyl-, bis(5-ethyl-2-methyl-1,2,3-dioxaphosphorinan-5-yl)methyl]ester, P,P'dioxide.

Component (3)

A comb like polymer consisting of a polyethyene main chain and a polyoxyalkylene main chain and a polyoxyalkylene side chain can be obtained by, for example, graft-copolymerization of a cyclic ether such as ethylene oxide or propylene oxide on to a saponification product of an ethylene-vinyl acetate copolymer; esterification between ethylene-vinyl acid copolymer and polyethylene glycol, polypropylene glycol or the like; copolymerization of ethylene with w-hydroxylpolyethylene oxide macromonomer; or the like. As its production process, the process disclosed in Japanese Patent Application is practicable which is a production process comprising heating an ethylene-vinyl acetate copolymer and an alcohol in the presence of an alkali catalyst to saponify them, removing the alcohol and then introducing alkylene oxide thereinto to form a graft copolymer.

Component (4)

A metal-containing compound having carbonization accelerating effect used in this invention increases the amount of carbonization residue after combustion, thereby enhancing the flame retarding effect. These compounds include, but not limited to, alkaline earth metal borates such as magnesium borate, calcium magnesium borate and the like, manganese borate, zinc borate, metal oxides of titanium oxide, tin oxide, nickel oxide, zinc oxide and the like, ferrocene, dimethylglyoxime copper, acetyl-acetonatocopper, hydroxyquinoline nickel and the like; zinc thiocarbamate compounds such as zinc dimethylthio-carbamate, zinc di-n-butyldithiocarbamate and the like, mer-captobenzothiazole zinc compounds such as mercaptoben-zothiazole zinc and the like; salicyladehyde zinc compounds such as salicylaldehyde zinc compounds such as salicylal-dehyde zinc and the like; metal hydroxides such as aluminum hydroxide, magnesium hydroxide, calcium magnesium hydroxide, zirconium hydroxide and the like.

The most preferable compounds are selected from zinc oxide, the zinc thiocarbamate compounds, the mercaptoben-zothiazole zinc compounds, the salicylaldehyde zinc compounds, zinc borate and the alkaline earth metal borates.

DETAIL DESCRIPTION OF THE INVENTION

The components are mixed and reacted under conditions sufficient to prepare the salt of organic polyphosphorus compounds and/or composition and flame retarded organic materials. Many of the reactions will take place at ambient temperature and pressure. Many of the reactions may be speeded up by using an elevated temperature of 100° C. to 300° C. When a gas is used it may be necessary to use increased pressure to compress the gas in order to form a liquid. The salt of organic phosphorus compounds are usually produced by mixing the organic polyphosphorus and the inorganic phosphorus compound then slowly heating while agitating the mixture until the reaction is complete, then the salt forming compound is added, then heated to up to about 300° C. for 10–60 minutes until the reaction is completed. Then the comb-like polymer, carbonization auxiliaries, carbonization accelators and fillers are added and mixed with the salt of organic polyphosphorus compound to form an flame retardant composition. The flame retardant salt of organic polyphosphorus compound and/or the flame retardant composition is added on or mixed in the more flammable organic material.

In this invention, the method of mixing the thermoplastic resin, the nitrogen-containing salt of organic polyphosphorus compound and/or composition, comb-like polymer consisting of a polyethylene main chain and a polyoxyalkylene side chain and a metal-containing compound having a carbonization accelerating effect is not critical. All the above components, thermoplastic resin, nitrogen-containing salt of organic polyphosphorus compound and/or composition, comb-like polymer and metal containing compound may added simultaneously then mixed together by any suitable means. They may be mixed together by using a Banbury mixer, an open roller, a kneader, a single or multiple screw extruder or the like with or without or after mixing by a Henschel mixer, a tumbler mixer or the like. The said mixture is heated until the thermoplastic resin softens or melts then is thoroughly mixed then extruded or molded into a desired shape. The salt of organic phosphorus compound components, organic phosphorus compound, inorganic phosphorus compound and basic salt forming compounds may be added separate with the thermoplastic resin, and are reacted when the mixture is heated.

The flame retardant thermoplastic composition of this invention may, if necessary, have added thereto a heat stabilizer, an antioxidant, a light stabilizer, a lubricant, an antifogging agent, a pigment, a blowing agent, a fluorescent agent, a release agent, a processing aid, a reinforcing agent and the like which are generally added to a thermoplastic resin, depending upon the uses of the composition. A known flame-retardant such as a halogen-containing flame retardant, an inorganic flame retardant or the like may also be added to the thermoplastic resin.

DESCRIPTION OF THE PREFERRED EMBODIMENT

The following examples which describe certain preferred embodiment of the processes may, of course, be varied as described above with similar results. This invention is not limited to the examples below. Parts and percentages are by weight unless otherwise indicated.

The following Reference Examples shows method for producing the basic salt of polyphosphorus compounds and compositions, and the comb-like polymer consisting of a polyethylene main chain and a polyoxyalkylene side chain. The salt of polyphosphorus compound is referred to hereinafter as SPP, the salt of polyphosphorus composition is referred to hereinafter as SPPA and the comb-like polymer is referred to hereinafter as CPO.

REFERENCE EXAMPLES

1. Method of Producing SPP-A 100 grams of a cyclic phosphonate ester (Antiblaze N produced by Albright & Wilson Americas) and 25 gms of phosphoric acid are mixed then heated to 100–150° C. for about 30 minutes and then 25 gms of melamine is added then heated to 150°–250° C. while agitating for about 30 minutes thereby producing a melamine salt of cyclic phosphonate-phosphoric acid compound. It is cooled then pulverized into a powder.

2. Method of Producing SPP-B 25 gms of phosphoric acid and 25 gms of melamine are mixed and reacted then 100 gms of a liquid cyclic phosphonate ester (Antiblaze 1025 produced by Albright & Wilson Americas) are added, then heated to 150°–250° C.

for 20 to 40 minutes while agitating, thereby producing a solid melamine salt of cyclic phosphonate-phosphorate compound. It is cooled then pulverized into a powder.

3. Method of Producing SPP-C 100 gms of liquid cyclic phosphonate (Antiblaze N produced by Albright and Wilson Americas) and 50 gms of melamine are mixed then heated for 30–40 minutes at 150–250° C. while agitating thereby producing melamine salt of cyclic phosphonate which is cooled then pulverized into a powder.

4. Method of Producing SPPC-A 100 gms of liquid cyclic phosphonate (Antiblaze N produced by Albright & Wilson Americas), 25 gms of phosphoric acid, 25 gms of melamine and 25 gms of ammonia polyphosphate are mixed, then heated to 150–250° C. while agitating for 30–50 minutes, thereby producing a ammonium melamine salt of cyclic phosphonate-phosphoric acid composition then 5 gms of zinc borate and 5 gms of a comb-like polymer consisting of a polyethylene main chain and a polyoxyalkylene side chain (CPO-A). The mixture is then cooled and pulverized into a powder.

5. Method of Producing CPO-A 0.5 kg of a saponified ethylene-vinyl acetate copolymer was placed in a 5-leter autoclave the 2.5 kg of ethylene oxide was introduced thereinto with stirring at a temperature of 150° C. for over 2 hours.

Example 1

100 parts by weight of liquid cyclic phosphonate esters (ANTIBLAZE N by Albright and Wilson Americas) and 20 parts by weight of polyphosphoric acid are mixed, then heated at 80°–120° C. at ambient pressure for 20–30 minutes, then 30 parts by weight of melamine are added. The mixture is heated up to about 300° C. while agitating for 20–30 minutes thereby producing a solid melamine salt of organic polyphosphorus compound. The mixture is cooled the pulverized into a powder.

Example 2

Example 1 is modified wherein an organic phosphite compound is used in place of the cyclic phosphonate esters and selected from the list below:

| | |
|---|---|
| a) trimethyl phosphite | b) dimethyl hydrogen phosphite |
| c) diethyl hydrogen phosphite | d) triethyl phosphite |
| e) triisopropyl phosphite | f) diisopropyl hydrogen phosphite |
| g) tributyl phosphite | h) dibutyl hydrogen phosphite |
| i) bis(2-ethylhexyl) hydrogen phosphite | j) triisooctyl phosphite |
| k) tris(2-chloroethyl) phosphite | l) dilauryl hydrogen phosphite |
| m) dilauryl hydrogen phosphite | n) dioleyl hydrogen phosphite |
| o) and mixtures thereof. | |

Example 3

Example 1 is modified wherein an organic phosphate compound is used in place of the cyclic phosphonate and selected from the list below:

| | |
|---|---|
| a) trimethyl phosphate | b) dimethyl hydrogen phosphate |
| c) triethyl phosphate | d) diethyl hydrogen phosphate |
| e) triisoproply phosphate | f) diisopropyl hydrogen phosphate |
| g) tributyl phosphate | h) dibutyl hydrogen phosphate |
| i) tributylethyl phosphate | j) dipheny hydrogen phosphate |
| k) diisooctyl hydrogen phosphate | l) di(2-ethylhexyl) hydrogen phosphate |
| m) octophenyl hydrogen phosphate | n) alkylchlorophosphines |
| o) and mixtures of the above. | |

Example 4

Example 1 is modified wherein an organic phosphonate compound is used in place of the cyclic phosphonate and selected from the list below:

| | |
|---|---|
| a) dimethyl methyl phosphonate | b) diethyl ethyl phosphonate |
| c) cyclic phosphonate (ANTIBLAZE 1045 by Albright & Wilson Americas) | d) dibutyl butyl phosphonate |
| e) bis(2-ethlyhexyl) 2-ethylhexyl phosphonate | f) bis(2-choloethyl) 2-chloroethyl phosphonate |
| g) and mixtures thereof. | |

Example 5

Example 1 is modified wherein an inorganic phosphorus acid compound is used in place of polyphosphoric acid and selected from the list below:

| | |
|---|---|
| a) phosphoric acid | b) pyrophosphoric acid |
| c) triphosphorus acid | d) metaphosphoric acid |
| e) phosphorus acid | f) hypophosphorus acid |
| g) phosphinic acid | h) phosphinous acid |
| i) phosphineoxide | j) phosphorus oxychloride |
| k) phosphorus trichloride | l) phosphorus oxide |
| m) mono-aluminum phosphate | n) ammonium phosphate |
| o) ammonium polyphosphate | p) boron phosphate |
| q) boron polyphosphate | r) phosphorus trioxide |
| s) phosphorus pentaoxide | t) phosphorus thiochloride |
| u) and mixtures of the above. | |

Example 6

Example 1 is modified wherein another basic salt forming compound is used in place of melamine and selected from the list below:

| | |
|---|---|
| a) urea | b) thiourea |
| c) ammonia | d) methyl urea |
| e) ammonium carbonate | f) ammonium bicarbonate |
| g) dicyandiamide | h) guanidine |
| i) aminoguanidine | j) methyl amine |
| k) propylene diamine | l) diethylenetriamine |
| j) aluminum hydroxide | k) magnesium hydroxide |
| l) boric oxide | m) ammonium borate |
| n) urea borate | o) buiret |
| p) isocyanuric acid | q) hydrolyzed buiret |
| r) hydrolyzed isocyanuric acid | s) urea-melamine condensation |
| t) ammonium carbamate | u) ammonium sulfamate |
| v) guanidine carbonate | x) urea melamine borate |
| y) ammonium silicate | z) and mixtures there of |

Example 7

100 parts by weight of liquid cyclic phosphonate (ANTIBLAZE N by Albright and Wilson Americas) and 60 parts by weight of urea are mixed, then heated between 100°–250° C. while agitating for 30 minutes thereby producing solid urea salt of cyclic phosphonate compound. The compound is cooled then pulverized into a powder.

Example 8

Example 7 is modified wherein another nitrogen-containing compound is used in place of the urea and selected from the list below:

| | |
|---|---|
| a) melamine | b) dicyandiamide |
| c) aminoguanidine | d) guanidine carbonate |
| e) guanidine | f) buiret |
| g) isocyanuric acid | h) hydrolyzed isocyanuric acid |
| i) hydrolyzed buiret | j) aminoguanidine |
| k) urea-formaldehyde condensation | l) urea-melamine condensation |
| m) thiourea | n) ethyl urea |
| o) diethylenetriamine | p) ethylene diamine |
| q) propylene diamine | r) melamine borate |
| s) urea borate | t) ammonium borate |
| u) ammonium carbonate | v) ammonium carbamate |
| w) acetamide | x) acetonitrile |
| y) phenyl isocyanate | z) mixtures of the above. |

Example 9

100 parts by weight of liquid cyclic phosphonate (ANTIBLAZE 1045 by Albright & Wilson America) and 60 parts by weight of melamine phosphate are mixed then heated to 150°–270° C. while agitating for 30 minutes thereby producing melamine salt of cyclic phosphonate-phosphate compound. The compound is then cooled then pulverized into a powder.

Example 10

Example 9 is modified wherein another amino phosphate is used in place of melamine phosphate and selected from the list below:

| | |
|---|---|
| a) urea phosphate | b) dimelamine phosphate |
| c) ethyl urea phosphate | d) buiret phosphate |
| e) aminoquanidine phosphate | f) dicyandiamide phosphate |
| g) isocyanuric phosphate | h) hydrated buiret phosphate |
| i) hydrated isocyanuric phosphate | j) urea-melamine phosphate |
| k) ammonium melamine phosphate | m) guanidine phosphate |
| n) and mixtures thereof. | |

Example 11

100 parts by weight of liquid cyclic phosphonate ester (ANTIBLAZE N by Albright & Wilson Americas) and 60 parts by weight of melamine are mixed then heated to 150°–300° C. while agitating for about 30 minutes thereby producing a melamine salt of organic polyphosphorus ester which is then cooled and pulverized into a powder.

Example 12

Example 11 is modified wherein another nitrogen containing compound is used in place of melamine and selected from the list below:

| | |
|---|---|
| a) urea | b) guanidine |
| c) dicyandiamide | d) aminoguanidine |
| e) buiret | f) hydrolyzed buiret |
| g) isocyanuric acid | h) hydrolyzed isocyanuric acid |
| i) ammonia | j) guanidine carbonate |
| k) aminoguanidine | l) ethylenediamine |
| m) acetamide | n) ammonia carbonate |
| o) urea phosphate | p) melamine phosphate |
| q) melamine borate | r) and mixtures of the above. |

Example 13

100 gms of dimethyl hydrogen phosphite and 25 gms of phosphorus oxytrihalide are mixed and reacted then 15 gms of ethyl alcohol are added and reacted. $Cl_2$ and HCl evolves from the mixture. 50 gms of melamine are added then heated to 150°–200° C. while agitating for about 30 minutes, thereby producing a melamine salt of dimethyl phosphite-diethyl phosphate. The mixture is then cooled and the solid is pulverized into a powder.

Example 14

Example 13 is modified wherein another organic phosphorus compound is used in place of dimethyl hydrogen phosphite and selected from the list below:

| | |
|---|---|
| a) dimethyl methyl phosphonate | b) trimethyl phosphite |
| c) diethyl ethyl phosphonate | d) triethyl phosphite |
| e) bis(2-ethylhexyl) phosphonate | f) 2-ethylhexyl phosphonate |
| g) diethyl hydrogen phosphite | h) triethyl phosphite |
| i) triisopropyl phosphite | j) butyl acid phosphate |
| k) phenyl acid phosphite | m) triethylhexyl phosphate |
| n) triethyl phosphate | o) triethyl phosphate |
| p) bis(2-ethylhexyl) pyrophosphoric acid | q) tripropyl phosphite |
| r) methylchlorophosphine | s) and mixtures thereof. |

Example 15

Example 13 is modified wherein another inorganic phosphorus compound is used in place of phosphorus oxytrichloride with or without evolvement of chlorine or hydrogen chloride and selected from the list below:

| | |
|---|---|
| a) phosphorus trichloride | b) $PCl_4$-$SiCl_3$, phosphorus-silicon halides |
| c) pyrophosphoric acid | d) phosphoric acid |
| e) polyphosphoric acid | f) phosphinic acid |
| g) phosphorus acid | h) phosphinous acid |
| l) phosphine oxide | j) phosphorus oxide |
| k) ammonium phosphate | l) mono-aluminum phosphate |
| m) mono-magnesium phosphate | o) boron polyphosphate condensation |
| p) and mixtures thereof | |

Example 16

Example 12 is modified wherein another nitrogen containing compound is used in place of melamine and selected from the list below:

| | |
|---|---|
| a) urea | b) thiourea |
| c) methyl urea | d) buiret |
| e) hydrolyzed buiret | f) isocyanuric acid |
| g) hydrolyzed isocyanuric acid | h) dicyandimide |
| i) dimelamine phosphate | j) melamine borate |
| k) guanidine | l) aminoguanidine |
| m) ammonium carbonate | n) guanidine carbonate |
| o) melamine borate | p) ethylene diamine |
| q) diethylenetriamine | r) ammonia |
| s) ethyl isocyanate | t) acetoamide |
| u) urea melamine condensation | v) hydrolyzed urea melamine condenstion |
| w) and mixtures of the above. | |

Example 17

100 parts by weight of unsaturated polyester resin, 0.5 part by weight of organic peroxide and 15 parts by weight the melamine salt of organic polyphosphorus compound produced in Example 1 are mixed then poured into a mold to produce a ⅛"×6"×6" sample. The sample is cured for one week then cut in ½" wide strips. These strips are tested by placing the strips in a verticle position the applying a 4" Bunsen burner under the strip with the flame hitting the strip. The flame is applied for 10 seconds and if not burning it is applied for another 10 seconds. The strips did not light after the flame was applied for 20 seconds.

Example 18

Example 17 was modified wherein 300 parts by weight of Portland cement containing 25% water was added to the unsaturated polyester resin thereby producing flame retardant polyester concrete. The sample was tested as in Example 16 and did not catch on fire.

Example 19

50 parts by weight of polymeric MDI (Mondur MR by Mobay), 50 parts by weight of sucrose polyol, OH No. 475, containing 1% foam regulator ( L5420 by Union Carbide), 0.025 part by weight of a tin polyurethane catalyst (T12 by Air Products), an amine catalyst (Polycat R 8020 by Air Products) and 4 parts by weight of water, and 20 parts by weight of urea salt of organic polyphosphorus compound produced in Example 7 are mixed then poured into a mold. The mixture foams into a rigid flame retarded polyurethane foam of about 2 lbs. per cubic foot. The foam is cured for 1 week then flame tested using a ½"×2"×5" sample which is placed vertically on a frame the a Bunsen burner with a 2" high flame is placed under the foam sample and the flame applied for 20 sec. as in UL 94 VO. The flame went out as soon as the Bunsen burner was removed. The melted plastic did not burn.

Example 20

15 parts by weight of dicyandiamide salt of organic polyphosphorus compound of Example 7b, 15 parts by weight of a polyol component with urethane catalyst (Pro-Design B by 3M), and 30 parts by weight of MDI prepolymer (Pro-Design A by 3M) are mixed and poured into a molds thereby forming solid flame retardant polyurethane samples, ⅛"×2"×6". These samples were cured for 1 week then flame tested using a 4" Bunsen burner flame which was placed at the bottom of a vertical sample for 1 minute. The flame went out as soon as the Bunsen burner was removed. There was about a 2% weight loss.

Example 21

100 parts by weight of ethylene modified polypropylene glycol (MULTRANOL 7056 by Miles), 30 parts by weight of hydrolyzed isocyanuric acid salt of organic polyphosphorus compound of Example 6r, 1 part by weight of silicone surfactant (L6202 by Union Carbide), 3 parts by weight of water, 0.5 weight of amine catalyst (polycat 33L by Air Products), 0.025 parts by weight of tin catalyst (T12 by Air Products) and 50 parts by weight of TDI (MONDUR TD80) are mixed then poured into a mold thereby producing a flame retardant flexible polyurethane foam. The foam was cured for 1 week then flame tested by using ½"×2"×6" samples hung vertically. A 4" Bunsen burner flame was placed under the foam for 1 minute. The flames did not spread and the melted drippings did not burn. The flexible foam was also flame tested by the method of Calif. TB 133 test and it passed the test because there was only a weight loss of 52 gms.

Example 22

Example 21 is modified wherein another polyisocyanate is used in place of TDI and selected from the list below:

| |
|---|
| a) polymeric MDI (MONDUR MR by Miles) |
| b) polymeric MDI (PAPI 27 Dow) |
| c) Polymeric MDI (MONDUR MRS) |
| d) MDI |

Example 23

30 parts by weight of the melamine salt of polyphosphorus-phosphate produced in Example 9, 70 parts by weight of a flexible polyepoxy resin (EPON R 828 by Shell) and 8 parts by weight of diamine (Ancamine by Air Products) are mixed then poured into a ⅛"×6"×6" mold and cured. After 1 week the sample is cut into ½" strips then flame tested by using a Bunsen burner with a 4" flame. The strips were hung vertically then the 4" Bunsen burner flame was placed at the bottom of the strip for 1 minute. After the flame was removed the flame went out. There was about a 2% weight loss.

Example 24

30 parts by weight of polyethylene pellets and 5 parts by weight of melamine salt of organic polyphosphorus compound produced by the process of Example 1, are mixed then heated until the polyethylene is capable of being melt-kneaded, usually in the range of 200°–300° C. The mixture is melt-kneaded until the flame retardant is thoroughly mix in the plastic. The plastic is then pressed into mold to obtain a sample of 1/16" to ⅛" thick. The sample is cut into ½" strips and flame tested by the method of UL 94 VO. The samples were placed vertically then a 4" Bunsen burner was placed at a 20 degree angle under the sample for two periods of 10 seconds. When the flame was removed the flame went out and the drippings did not catch on fire. The samples had good physical properties.

Example 25

Example 24 was modified wherein another thermoplastic resin was used in place of polyethylene and selected from the list below and flame tested as in Example 22 with the same results:

| | |
|---|---|
| a) polypropylene | b) polyvinyl acetate |
| c) polystyrene | d) polyamide (nylon) |
| e) ethylene-vinyl acetate copolymer | f) ethylene-propylene copolymer |
| g) polyester resin | h) ethylene-acrylic copolymer |
| i) ethylene-vinyl acetate copolymer | j) ethylene-vinyl alcohol copolymer |
| k) adipic acid-vinyl acetate copolymer | l) polyvinyl toluene |
| m) styrene-acrylonitrile copolymer | n) styrene-butadiene copolymer |
| o) polybutadiene | p) styrene-methyl methacrylate copolymer |
| q) acrylonitrile-butadiene-styrene copolymer | r) polycarbonate |
| s) polysulfone | t) polyphenyl ether |
| u) polybutylene terephthalate | v) ethylene-propylene copolymer |
| w) polymethyl methacrylate | x) polyvinyl chloride |
| y) styrene-maleic anhydride copolymer | z) and mixtures of the above. |

Example 26

Example 23 is modified wherein another salt of organic polyphosphorus compound or composition, and selected from the Examples in the list below. They were flame tested as in Example 22 and obtaining the same good results:

| | | | | |
|---|---|---|---|---|
| a) 2b | b) 3n | c) 4a | d) 4b | e) 4c |
| f) 4e | g) 5a | h) 5b | i) 5o | j) 5p |
| k) 5J | l) 6g | m) 6i | n) 6p | o) 6q |
| p) 7 | q) 8a | r) 8b | s) 8g | t) 9 |
| u) 9b | v) 12b | w) 12j | x) 12p | y) 12h |
| z) 13. | | | | |

Example 27

Example 24 is modified wherein carbonization auxiliaries are added in the amount of 3 parts by weight, and selected from the list below.

| | |
|---|---|
| a) ammonium polyphosphate | b) melamine polyphosphate |
| c) melamine borate | d) melamine phosphate |
| e) dimelamine phosphate | f) urea phosphate |
| g) urea polyphosphate | h) boron polyphosphate condensation |
| i) urea-melamine phosphate | j) dicyandiamide phosphate |
| k) dimethyl hydrogen phosphite | l) hydrolyzed buiret phosphate |
| m) buiret phosphate | n) guanidine phosphate |
| o) sulfamic acid | p) ammonium sulfate |
| q) ethylamine phosphate | r) boric oxide |
| s) methyl carbamate phosphate | t) cyanoguanidine phosphate |
| u) phosphorus oxide | v) diethylenetriamine phosphate |
| w) urea-melamine phosphate | x) hydrolyzed urea-melamine phosphate |
| y) isocyanuric phosphate | z) and mixtures of the above. |

Example 28

Example 24 is modified wherein 1 part by weight of a metal-containing having a carbonization accelerating effect compound is added with the components and selected from the list below:

| | |
|---|---|
| a) zinc borate | b) zinc oxide |
| c) zinc thiocarbarnate | d) calcium borate |
| e) ferricene | f) aluminum hydroxide |
| g) magnesium hydroxide | h) salicylaldehyde zinc |
| i) calcium magnesium hydroxide | j) titanium oxide |
| k) manganese borate | l) tin oxide |
| m) nickel oxide | n) mercaptobenzothiazole zinc |
| o) and mixtures of the above. | |

Example 29

Example 24 is modified wherein 1 part by weight of a comb-like polymer comprising the polyethylene main chain and polyoxyalkylene side chain is added to the components.

Example 30

10 parts by weight of phosphoric acid and 10 parts by weight of melamine are reacted then 40 parts by weight of cyclic phosphonate esters (ANTI BLAZE 1045 by Albright & Wilson Americas) are added and mixed. The mixture is then mixed with 300 parts by weight of polyethylene pellets, then heated to the melting point of the polyethylene, and the melamine phosphate and cyclic phosphonate esters react with each other. The components are melt-kneaded until they are thoroughly mixed then pressed into a mold producing samples of 1/16" to 1/8" thick. The samples are cut into 1/2" strip then flame tested. They are hung in a vertical position then a 4" Bunsen burner is placed under the samples with the flame hitting the samples. The flame is left on the bottom of the sample for 10 seconds, then for another 10 seconds. The samples did not burn after the flame was removed. The melted plastic did not catch on fire.

Example 31

10 parts by weight of melamine, 20 parts by weight of cyclic phosphonate esters (ANITBLAZE N by Albright & Wilson Americas) and 200 parts by weight of polypropylene pellets are mixed the heated to about 200° to 250° C. The melamine and the organic polyphosphorus compound (cyclic phosphonate esters) reacted together to for a melamine salt of organic polyphosphorus compound. The component are melt-kneaded until they are thoroughly mixed then pressed into a mold producing samples of 1/16" to 1/8" thick. The samples are cut into 1/2" strips then flame tested while in a verticle position. A 4" Bunsen burner flame is placed on the bottom of the sample for two 10 seconds and they did not catch on fire. The melted drippings did not catch on fire.

Example 32

Example 31 is modified wherein the melamine and cyclic phosphonate ester are first reacted, then cooled and pulverized into a powder, then added to the polypropylene pellets.

Example 33

Example 31 is modified wherein 3 parts by weight of zinc borate, 5 parts by weight of ammonium polyphosphorate and 3 parts by weight of a comb-like polymer consisting of a polyethylene main chain and a polyoxyalkylene side chain are added to the polyproplene pellets.

Example 34

Example 31 is modified wherein another thermoplastic resin is used in place of polyproplylene and selected from the list below:

| | |
|---|---|
| a) polyethylene | b) nylon (polyamide) |
| c) polyvinyl acetate | d) ethylene-vinyl acetate copolymer |
| e) polyester resin | f) polyvinylidene chloride |
| g) polyurethane resin | h) polyurethane-epoxy resin |
| i) polystyrene | j) polymethylstyrene |
| k) styrene-acrylonitrile copolymer | l) polymethacrylate |
| m) polycarbonate | n) polyestersulfone |
| o) butadiene acrylonitrile copolymer | p) polyethylene terephthalate |
| q) butylene terrephthalate resin | r) styrene-maleic anhydride copolymer |
| s) polyacetal resin | t) ethylene-propylene-vinyl acetate copolymer |
| u) silicone resin | v) acrylic acid-methacrylic copolmer |
| w) polybutylene | x) phenol-aldehyde resin |
| y) polyimide | z) and mixtures of the above. |

Example 35

20 parts by weight of SPP-A and 100 parts by weight of styrene monomer containing a free-radical catalyst system are mixed, and reacted thereby producing a flame retardant polystyrene resin. The flame retardant polystyrene resin was molded into 1/16 to 1/8" samples then cut into 1/2" strips. These strips were placed vertically in a holder the flame tested with a 4" Bunsen burner for two 10 seconds periods, and the samples did not catch on fire.

Example 36

Example 35 is modified wherein another salt of organic polyphosphorus compound of composition is used in place of SPP-A and selected from the list below:

| |
|---|
| a) SPP-B |
| b) SPP-C |
| c) SPPC-A |
| d) and mixtures of the above. |

Example 37

Example 33 is modified wherein another vinyl monomer is used in place of styrene and selected from the list below:

| | |
|---|---|
| a) acrylonitrile | c) acrylic acid |
| d) methacrylic acid | e) methyl methacrylate |
| f) methacrylate | g) and mixtures thereof. |

I claim:

1. A flame retardant composition comprising a flammable organic material selected from the group consisting of plastic resins, natural products and mixtures thereof having incorporated a flame retardant amount of:
   A) a nitrogen containing salt of organic polyphosphorus oxyacid produced by the process comprising of mixing, heating and reacting in stoichiometric proportions the following components;
      a) an organic cyclic phosphonate ester; in the amount of 100 to 200 parts by weight
      b) an inorganic phosphorus oxyacid in the amount of 100 parts by weight and selected from the group consisting of phosphoric acid, polyphosphoric acid, pyrophosphoric acid and mixtures thereof thereby producing an organic polyphosphorus oxyacid then adding, mixing and reacting
      c) a nitrogen containing basic salt forming compound selected from the group consisting of ammonia, amino compounds, amines, polyamines and mixtures thereof; in the amount of 30 to 200 parts by weight
   B) a comb-like polymer consisting of a polyethylene main chain and a polyoxyalkylene side chain; in the amount of 0 to 30 parts by weight
   C) a metal-containing compound having a carbonization accelerating effect; in the amount of 0 to 30 parts by weight
   D) a carbonization auxiliaries; in the amount of 0 to 100 parts by weight
   E) a filler, in the amount of 0 to 400 parts by weight
   the components A–E being 5 to 50% by weight, based on the weight of the flammable organic material.

2. The flame retardant composition of claim 1, wherein the comb-like polymer consisting of a polyethylene main chain and a polyoxyalkylene side chain is a compound obtained by graft-copolymerizing 50 to 800 parts by weight of ethylene oxide onto 100 part by weight of a saponification product of an ethylene-vinyl acetate copolymer having a number average molecular weight of 1,000 to 10,000 and vinyl acetate content of 5 to 49% by weight; in the amount of 0 to 30 parts by weight.

3. The flame retardant composition of claim 1, wherein the carbonization auxiliaries are selected from the group consisting of phosphorus containing compounds, boron containing compounds, boron-phosphate containing compounds, and sulfur containing compounds that produce acidic components in the pyrolysis mixture; in an amount 0 to 100 parts by weight.

4. The flame retardant composition of claim 1, wherein the metal containing compound having a carbonization accelerating effect is at least one compound selected from the group consisting of zinc oxide, zinc thiocarbamate compounds, mercaptobenzothiazole zinc compounds, mercaptobenzothiazol zinc compounds, salicylaldehyde zinc compounds, zinc borate, and alkaline earth metal borates; in the amount 0 to 30 parts by weight.

5. The flame retardant composition of claim 1, wherein the filler is selected from the group consisting of urea, melamine, dicyandiamide, melamine cyanurate, amino phosphates, aminoplasts, phenoplasts, ammonium phosphates, powdered synthetic resins, sawdust, carbohydrates, bituminous additives, graphite, graphite compounds, cyanuric derivatives or their formaldehyde resins, powdered coke, silica, alkali metal silicates, alkaline earth metal silicates, metals and metal oxides, carbonates, sulphates, phosphates and borates, glass beads, hollow beads, hydrated aluminum oxide, and mixtures thereof; in the amount of 0 to 400 parts by weight.

6. A flame retardant thermoplastic resin composition of claim 1 which comprises:
   1) a thermoplastic resin; in the amount of 100 to 200 parts by weight
   2) a nitrogen containing salt of organic polyphosphorus oxyacid compound, in the amount of 5 to 50 parts by weight
   3) a comb-like polymer consisting of a polyethylene main chain and a polyoxyalkylene side chain of 0 to 30 parts by weight 4) a carbonization auxiliaries; in the amount of 0 to 100 parts by weight 5) a metal-containing compound having a carbonization accelerating effect; in the amount of 0 to 100 parts by weight 6) a filler; in the amount of 0 to 400 parts by weight.

7. The flame retardant thermoplastic resin composition of claim 6, wherein the thermoplastic resin is a thermoplastic resin consisting of at least one olefin polymer.

8. The flame retardant thermoplastic resin composition of claim 6, wherein thermoplastic resin is a thermoplastic resin consisting of at least one vinyl aromatic polymer.

9. The flame retardant thermoplastic resin composition of claim 6, wherein the nitrogen containing salt of organic polyphosphorus oxyacid compound is an amino salt of an organic cyclic phosphonate-phosphoric acid.

10. A process for producing a flame retardant composition of claim 1 which comprises mixing the following components with a flammable organic material:

A) a nitrogen containing salt of organic polyphosphorus oxyacid; in the amount of 100 to 200 parts by weight B) a comb-like polymer consisting of a polyethylene main chain and a polyoxyalkylene side chain; 0 to 100 parts by weight C) a carbonization auxiliaries; 0 to 100 parts by weight D) a metal-containing compound having a carbonization accelerating effect; in the amount of 0 to 30 parts by weight E) a filler; in the amount of 0 to 400 parts by weight;

the flame retardant components A–E are used in the amount of 5% to 50% based the weight of the flammable material.

11. A process for the production of flame retardant thermoplastic resin composition of claim 1, which comprises mixing the following components:

1) a thermoplastic resin; in the amount of 100 to 200 parts by weight 2) a nitrogen containing salt of organic polyphosphorus oxyacid compound; in the amount of 5 to 50 parts by weight 3) a comb-like polymer consisting of a polyethylene main chain and a polyoxyalkylene side chain; in the amount of 0 to 30 parts by weight 4) a carbonization auxiliaries; in the amount of 0 to 100 parts by weight 5) a metal-containing compound having a carbonization accelerating effect; in the amount of 0 to 30 parts by weight 6) a filler; in the amount of 0 to 400 parts by weight.

12. The flame retardant composition of claim 1, wherein the flammable organic material is an unsaturated polyester resin containing a free-radical initiator curing agent thereby producing a flame retardant polyester resin.

13. The flame retardant composition of claim 1, wherein the flammable organic material is an unsaturated polyester resin containing a free-radical initiator curing system, and the filler is wet Portland cement thereby producing a flame retardant polyester concrete.

14. The flame retardant composition of claim 1, wherein the flammable organic material is a polyepoxy resin containing an epoxy curing agent thereby producing a flame retardant polyepoxy resin.

15. The flame retardant composition of claim 1, wherein the flammable organic material is a polyurethane thereby producing a flame retardant polyurethane.

16. The flame retardant composition of claim 1, wherein the flammable organic material is a vinyl monomer containing a free radical initiator curing system thereby producing a flame retardant polyvinyl resin.

17. The flame retardant composition of claim 1, wherein the flammable organic material is a polyamide thereby producing a flame retardant polyamide.

* * * * *